US006667848B1

(12) United States Patent
Khizroev et al.

(10) Patent No.: US 6,667,848 B1
(45) Date of Patent: Dec. 23, 2003

(54) PERPENDICULAR MAGNETIC RECORDING HEAD WITH MEANS FOR SUPPRESSING NOISE FROM SOFT MAGNETIC UNDERLAYER OF RECORDING MEDIA

(75) Inventors: Sakhrat Khizroev, Pittsburgh, PA (US); Dmitri Litvinov, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 329 days.

(21) Appl. No.: 09/757,432

(22) Filed: Jan. 10, 2001

Related U.S. Application Data
(60) Provisional application No. 06/175,265, filed on Jan. 10, 2000, provisional application No. 60/175,271, filed on Jan. 10, 2000, provisional application No. 60/180,293, filed on Feb. 4, 2000, provisional application No. 60/189,365, filed on Mar. 15, 2000, provisional application No. 60/191,974, filed on Mar. 24, 2000, and provisional application No. 60/191,775, filed on Mar. 24, 2000.

(51) Int. Cl.[7] ............................................. G11B 5/147
(52) U.S. Cl. ......................................................... 360/125
(58) Field of Search ............................. 360/97.01, 111, 360/313, 125, 126, 318.01, 110, 318.1, 119, 319, 120, 121, 122, 123, 124, 127, 128

(56) References Cited

U.S. PATENT DOCUMENTS

| | | | | |
|---|---|---|---|---|
| 2,840,440 A | * | 6/1958 | McLaughlin et al. | 360/122 |
| 4,138,702 A | | 2/1979 | Magnenet | |
| 4,317,148 A | * | 2/1982 | Chi | 360/125 |
| 4,410,603 A | | 10/1983 | Yamamori et al. | |
| 4,423,450 A | * | 12/1983 | Hamilton | 360/111 |
| 4,438,471 A | | 3/1984 | Oshiki et al. | |
| 4,541,026 A | | 9/1985 | Bonin et al. | |
| 4,546,398 A | | 10/1985 | Toda et al. | |
| 4,575,777 A | | 3/1986 | Hosokawa | |
| 4,613,918 A | | 9/1986 | Kanai et al. | |
| 4,629,660 A | | 12/1986 | Sagoi et al. | |
| 4,649,449 A | | 3/1987 | Sawada et al. | |
| 4,652,956 A | | 3/1987 | Schewe | |
| 4,656,546 A | * | 4/1987 | Mallory | 360/110 |
| 4,725,909 A | * | 2/1988 | Kawai | 360/126 |
| 4,731,157 A | | 3/1988 | Lazzari | |
| 4,742,413 A | | 5/1988 | Schewe | |
| 4,751,598 A | | 6/1988 | Hamilton | |
| 4,771,350 A | | 9/1988 | Desserre | |
| 4,803,581 A | * | 2/1989 | Kira et al. | 360/125 |
| 4,897,749 A | | 1/1990 | Perlov et al. | |
| 4,943,882 A | | 7/1990 | Wada et al. | |
| 4,974,110 A | | 11/1990 | Kanamine et al. | |
| 5,057,957 A | | 10/1991 | Ito et al. | |
| 5,073,836 A | | 12/1991 | Gill et al. | |

(List continued on next page.)

FOREIGN PATENT DOCUMENTS

JP          56-003422     *    1/1981    ............ G11B/5/12

OTHER PUBLICATIONS

IBM Technical Disclosure Bulletin. "Perpendicular Recording Media with Patterned Magnetic Underlayer to Reduce Readback Signal Envelope Modulation." Mar. 1987, IBM, vol. 29, Issue 10, pp. 4256–4266.*

Sharat Batra, U.S. Utility patent application Ser. No. 09/759,948, Perpendicular Magnetic Recording Head With Radial Magnetic Field Generator Which Reduces Noise From Soft Magnetic Underlayer of Recording Disk, filed Jan. 12, 2001.

*Primary Examiner*—George J. Letscher
*Assistant Examiner*—C. R. Beacham
(74) *Attorney, Agent, or Firm*—Alan G. Towner, Esq.; Pietragallo, Bosick & Gordon (57) ABSTRACT

The present invention provides a modified perpendicular magnetic recording head which generates a relatively small magnetic field in the soft underlayer of a magnetic recording disk in order to reduce unwanted noise from the underlayer. The noise-suppressing magnetic field is sufficiently strong to effectively drive magnetic domains out of the soft underlayer underneath the head.

24 Claims, 7 Drawing Sheets

U.S. PATENT DOCUMENTS

| | | | |
|---|---|---|---|
| 5,075,280 A | * 12/1991 | Pisharody et al. | 360/119 |
| RE33,949 E | 6/1992 | Mallary et al. | |
| 5,195,005 A | 3/1993 | Mallary et al. | |
| 5,196,976 A | 3/1993 | Lazzari | |
| 5,225,953 A | 7/1993 | Wada et al. | |
| 5,311,386 A | 5/1994 | Mallary | |
| 5,333,086 A | 7/1994 | Frey et al. | |
| 5,396,391 A | 3/1995 | Tanaka et al. | |
| 5,436,779 A | 7/1995 | Valstyn | |
| 5,738,927 A | 4/1998 | Nakamura et al. | |
| 5,815,342 A | * 9/1998 | Akiyama et al. | 360/97.01 |
| 5,815,909 A | 10/1998 | Gray | |
| 5,920,449 A | * 7/1999 | Tagawa | 360/125 |
| 5,942,342 A | 8/1999 | Hikosaka et al. | |
| 6,008,969 A | 12/1999 | Imai et al. | |
| 6,531,202 B1 | * 3/2003 | Litvinov et al. | 428/900 |
| 6,574,072 B1 | * 6/2003 | Batra | 360/125 |

* cited by examiner

PERPENDICULAR MAGNETIC RECORDING HEAD WITH MEANS FOR SUPPRESSING NOISE FROM SOFT MAGNETIC UNDERLAYER OF RECORDING MEDIA

CROSS REFERENCE TO RELATED APPLICATION

This application claims the benefit of U.S. Provisional Patent Application Serial No. 60/175,265 filed Jan. 10, 2000; U.S. Provisional Patent Application Serial No. 60/175,271 filed Jan. 10, 2000; U.S. Provisional Patent Application Serial No. 60/180,293 filed Feb. 4, 2000; U.S. Provisional Patent Application Serial No. 60/189,365 filed Mar. 15, 2000; U.S. Provisional Patent Application Serial No. 60/191,974 filed Mar. 24, 2000; and U.S. Provisional Patent Application Serial No. 60/191,775 filed Mar. 24, 2000.

FIELD OF THE INVENTION

The present invention relates to perpendicular magnetic recording heads, and more particularly relates to recording heads which include means for suppressing unwanted noise from the soft magnetic underlayer of the recording disk.

BACKGROUND INFORMATION

Perpendicular magnetic recording systems have been developed for use in computer hard disk drives. An approach to perpendicular magnetic recording requires the use of recording media with a magnetically soft underlayer which provides a flux path from the trailing pole to the leading pole of the writer. The soft underlayer enables substantially stronger fields than can be generated with a ring head in conventional longitudinal recording systems. The soft underlayer also provides sharper field gradients which enable writing on high coercivity media. In addition, the soft underlayer also helps during the read operation. During the read back process, the soft underlayer produces the image of magnetic charges in the magnetically hard layer, effectively increasing the magnetic flux coming from the media. This provides a higher playback signal.

One of the challenges of implementing perpendicular recording is to resolve the problem of soft underlayer noise. The noise is caused by fringing fields generated by magnetic domains, or uncompensated magnetic charges, in the soft underlayer that can be sensed by the reader. For the write process to be efficient, high moment materials, e.g., $B_S<20$ kG, may be used for the soft underlayer. If the magnetic domain distribution of such materials is not carefully controlled, very large fringing fields can introduce substantial amounts of noise in the read element. Not only can the reader sense the steady-state distribution of magnetization in the soft underlayer, but it can also affect the distribution of magnetization in the soft underlayer, thus generating time-dependent noise. Both types of noise should be minimized.

The present invention has been developed in view of the foregoing.

SUMMARY OF THE INVENTION

The present invention provides a perpendicular magnetic recording head which magnetically biases the soft underlayer of the magnetic recording media. By forcing substantial magnetic flux into the body of the soft underlayer, the magnetic domain walls are effectively driven out of the soft underlayer, particularly in the region underneath the read-part of the recording head. The reduction or elimination of magnetic domain walls suppresses unwanted noise that would otherwise be caused by the domain walls.

An aspect of the present invention is to provide a perpendicular magnetic recording head including at least one magnetic recording element, and means for generating a magnetic field which reduces noise from a soft magnetic underlayer of a recording medium during operation of the magnetic recording element.

Another aspect of the present invention is to provide a perpendicular magnetic recording head including at least one magnetic recording element, and at least one noise-suppressing magnetic field generating element spaced apart from the magnetic recording element.

A further aspect of the present invention is to provide a perpendicular magnetic recording system. The system includes a perpendicular magnetic recording medium having a hard magnetic recording layer and a soft magnetic underlayer, and a perpendicular magnetic recording head positionable over the medium having at least one magnetic recording element and at least one magnetic field generating element positioned to generate a noise-suppressing magnetic field in the soft magnetic underlayer in a region of the medium under the recording element.

These and other aspects of the present invention will be more apparent from the following description.

DETAILED DESCRIPTION

Figure 1:
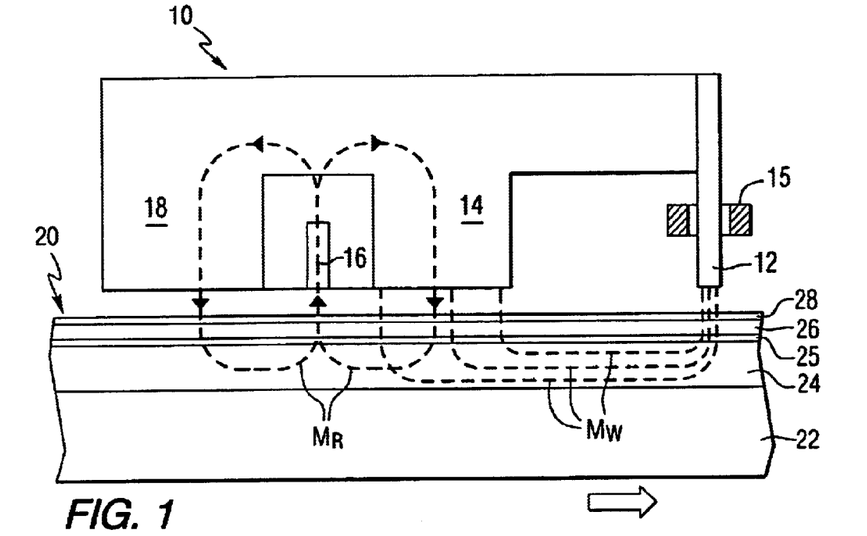
FIG. 1 is a partially schematic side view of a perpendicular magnetic recording head and recording disk illustrating magnetic flux paths through the soft underlayer of the disk during recording operations.

FIG. 1 is a partially schematic side view of a perpendicular magnetic recording head 10. The recording head 10 includes a writer section comprising a trailing main pole 12 and a return or opposing pole 14. A magnetization coil 15 surrounds the main pole 12. The recording head 10 also includes a reader section comprising a read element 16 positioned between a reader pole 18 and the opposing pole 14. The read element 16 may be a conventional GMR reader, MR reader, inductive reader or the like. In the embodiment shown in FIG. 1, the reader section shares the opposing pole 14 of the writer section.

A perpendicular magnetic recording medium 20 is positioned under the recording head 10. The recording medium 20 travels in the direction of the arrow shown in FIG. 1 during recording. The recording medium 20 includes a substrate 22, which may be made of any suitable material such as ceramic glass, amorphous glass or NiP plated AlMg. A magnetically soft underlayer 24 is deposited on the substrate 22. Suitable soft magnetic materials for the underlayer 24 include CoFe and alloys thereof, Fe and alloys thereof, FeAlN, NiFe, CoZrNb and FeTaN, with CoFe and FeAlN being particularly suitable soft materials. A thin exchange decouple layer 25 made of a non-magnetic material such as CoCr may be deposited on the soft underlayer 24. A magnetically hard perpendicular recording layer 26 is deposited on the exchange decouple layer 25. Suitable hard magnetic materials for the recording layer 26 include multilayers of Co/Pd or Co/Pt, L10 phases of CoPt, FePt, CoPd and FePd and hcp Co alloys, with such multi layers and L10 phases being particularly suitable hard materials. A protective overcoat 28 such as diamond-like carbon may be applied over the recording layer 26.

As shown in FIG. 1, during writing operations, magnetic flux is directed along a path $M_W$ from the main pole 12 perpendicularly through the recording layer 26, then in the plane of the soft underlayer 24 back to the opposing pole 14. During reading operations, magnetic flux $M_R$ is directed along the paths $M_R$ from the recording layer 26 into the read element 16, through the poles 18 and 14, into the soft underlayer 24, and back through the recording layer 26.

Figure 2:
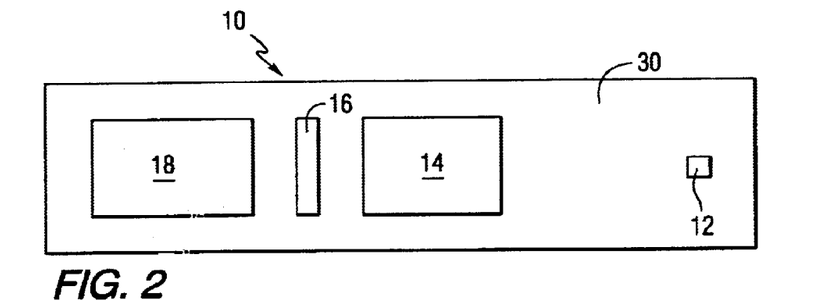
FIG. 2 is a partially schematic bottom view showing the air bearing surface of a perpendicular magnetic recording head which includes both writing and reading elements.

FIG. 2 is a partially schematic bottom view of the air bearing surface of the recording head 10, which may be modified in accordance with the present invention. The perpendicular read/write head 10 includes an air bearing surface 30 which may be flush with the ends of the main pole 12 and opposing pole 14.

Figure 3:
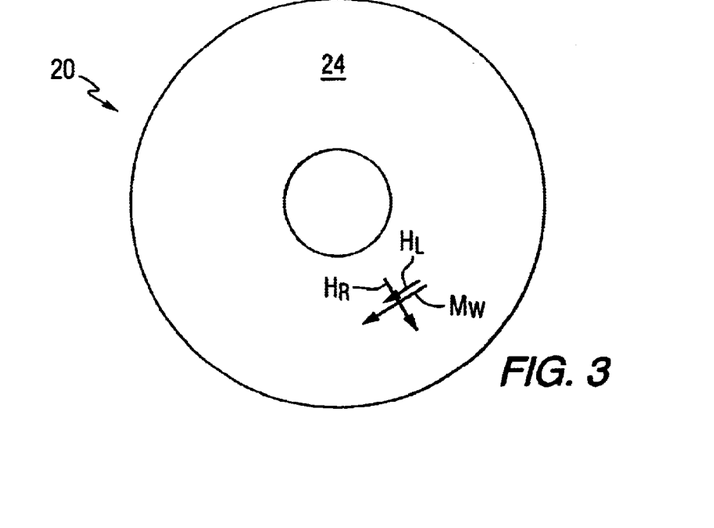
FIG. 3 is a top view of a magnetic recording disk illustrating two different noise-reducing magnetic fields that may be generated in the soft magnetic underlayer of the disk in accordance with embodiments of the present invention.

FIG. 3 is a top view illustrating the soft underlayer 24 of the magnetic recording disk 20. The magnetic field $M_W$ generated by the perpendicular recording head travels through the soft magnetic underlayer 24 along the direction of the recording tracks of the disk 20 during writing operations. FIG. 3 also illustrates noise-suppressing magnetic fields that may be generated in the soft underlayer 24. As used herein, the term "noise-suppressing magnetic field" means a magnetic field generated in the soft underlayer that reduces or eliminates magnetic domain walls from the underlayer. In one embodiment, the noise-suppressing magnetic field $H_R$ generated in the soft underlayer is substantially perpendicular to the magnetic field $M_W$. In another embodiment, the noise-suppressing magnetic field $H_L$ generated in the soft underlayer 24 is substantially parallel with the magnetic field $M_W$. Although a radial noise-suppressing field $H_R$ and a circumferential noise-suppressing field $H_L$ are shown in FIG. 3, other orientations of the noise-suppressing magnetic field(s) may be used in accordance with the present invention.

The strength of the noise-suppressing magnetic field may be controlled in order to sufficiently reduce noise caused by domain walls in the underlayer. Anisotropic underlayer materials have an easy axis and a hard axis. If the noise-suppressing magnetic field is applied along the easy axis, the magnetic field may be relatively low, e.g., from about 0.5 to about 10 Oe. If the noise-suppressing magnetic field is applied along the hard axis, the magnetic field may be higher, e.g., from about 50 to about 100 Oe. For orientations between the easy axis and hard axis, the noise-suppressing magnetic field may be an intermediate strength. For isotropic underlayer materials, typical strengths of the noise-suppressing magnetic field range from about 1 Oe to about 100 Oe. The strengths of the noise-suppressing magnetic fields, e.g., $H_R$ and $H_L$, in the soft underlayer 24 may be substantially less than the strength of the recording magnetic field $M_W$. For example, the noise-suppressing magnetic field may be at least 100 times smaller than the recording field $M_W$. As a particular example, the noise-suppressing magnetic field may range from about 1 to about 100 Oe, while the recording magnetic field Mw may range from about 5,000 to about 20,000 Oe.

Figure 4:
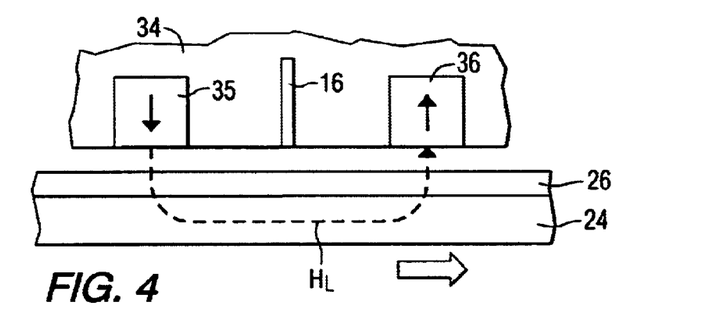
FIG. 4 is a partially schematic side sectional view of the reader portion of a perpendicular magnetic recording head including noise-suppressing magnets in accordance with an embodiment of the present invention.

FIG. 4 is a partially schematic side sectional view of a reader portion of a perpendicular magnetic recording head 34 including noise-suppressing magnets 35 and 36 located on opposite sides of the reader 16. The magnets 35 and 36 may be made of any suitable material such as hcp Co alloys, CoSm, NdFeB or L10 phases of CoPt, CoPd, FePt and FePd. As shown in FIG. 4, the magnets 35 and 36 generate a noise-suppressing magnetic field $H_L$ in the soft underlayer 24 which extends in a direction parallel with the recording tracks of the recording layer 26.

Figure 5:
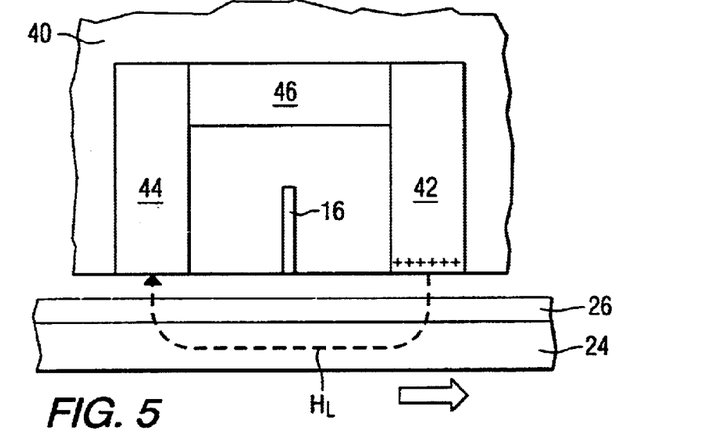
FIG. 5 is a partially schematic side sectional view of the reader portion of a perpendicular magnetic recording head including noise-suppressing magnets in accordance with another embodiment of the present invention.

FIG. 5 is a partially schematic side sectional view of a reader portion of a perpendicular magnetic recording head 40 including permanent magnets 42 and 44 located on opposite sides of the read element 16. A magnetically permeable yoke 46 extends between the upper portions of the magnets 42 and 44. The yoke 46 may be made of any suitable material such as Permalloy, Ni45Fe45, CoZrNb, CoZrTa, FeAlN, FeTaN, CoFe and CoFeB. The magnets 42 and 44 generate the noise-suppressing magnetic field $H_L$ in the soft underlayer 24.

Figure 6:
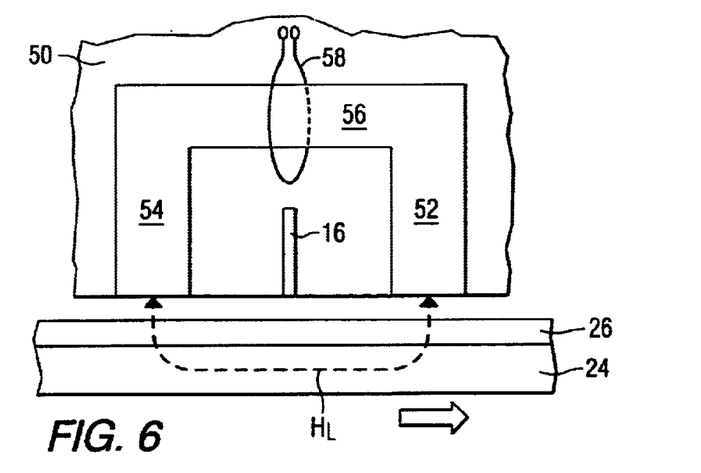
FIG. 6 is a partially schematic side sectional view of the reader portion of a perpendicular magnetic recording head including a noise-suppressing coil and yoke assembly in accordance with a further embodiment of the present invention.

FIG. 6 is a partially schematic side sectional view of a reader portion of a perpendicular magnetic recording head 50 in accordance with a further embodiment of the present invention. The recording head 50 includes soft magnetic poles 52 and 54 on opposite sides of the read element 16. The magnetic poles 52 and 54 are connected by a magnetically permeable yoke 56. The poles 52, 54 and yoke 56 may be made of a material such as Permalloy, Ni45Fe45, CoZrNb, CoZrTa, FeAlN, FeTaN, CoFe and CoFeB. A magnetization coil 58 surrounds the yoke 56. When electric current is supplied to the coil 58, the noise-suppressing magnetic field $H_L$ is generated between the poles 52 and 54 in the soft underlayer 24. As opposed to the embodiments shown in FIGS. 4 and 5, the recording head 50 of FIG. 6 is capable of switching the direction of the noise-suppressing magnetic field $H_L$ depending upon the current direction in the coil 58.

Figure 7:
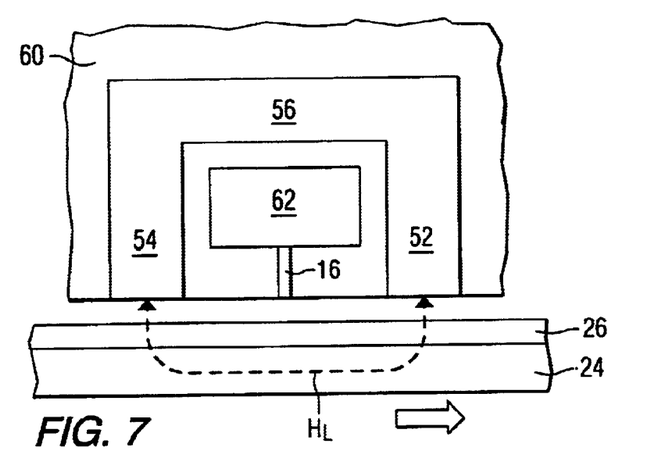
FIG. 7 is a partially schematic side sectional view of the reader portion of a perpendicular magnetic recording head including a noise-suppressing conductive wire and yoke assembly in accordance with another embodiment of the present invention.

FIG. 7 is a partially schematic side sectional view of a portion of a perpendicular magnetic recording head similar to the embodiment shown in FIG. 6, except the magnetization coil 58 is replaced by an electrically conductive wire or line 62, which is shown in cross section in FIG. 7. The conductive line 62 may be made of any suitable electrically conductive material such as Cu, Ag or Ta. The noise-suppressing magnetic field $H_L$ can be reversed by switching the direction of current flow in the conductive line 62.

Figure 8:
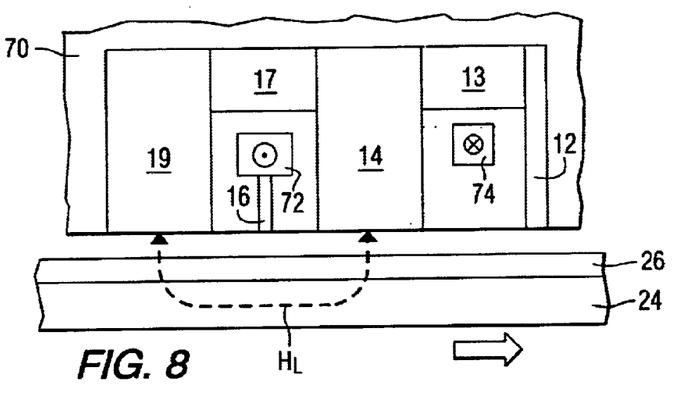
FIG. 8 is a partially schematic sectional view of the reading and writing portions of a perpendicular magnetic recording head including a noise-suppressing conductive wire and yoke assembly in accordance with a further embodiment of the present invention.
Figure 9:
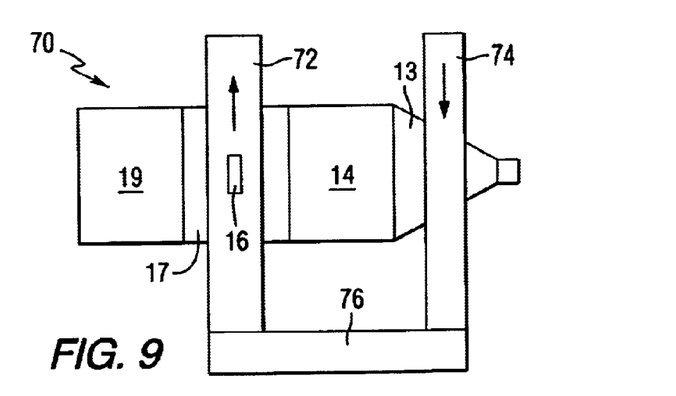
FIG. 9 is a partially schematic bottom view of the air-bearing surface of the perpendicular magnetic recording head of FIG. 8.

FIGS. 8 and 9 schematically illustrate read and write portions of a perpendicular magnetic recording head 70 in accordance with another embodiment of the present invention. In this embodiment, a magnetically permeable read pole 19 is located on one side of the reader element 16, while the opposing pole 14 is located on the opposite side of the reader element 16. A magnetically permeable yoke 17 extends from the reader pole 19 to the opposing pole 14. Another magnetically permeable yoke 13 extends from the opposing pole 14 to the main write pole 12. A first electrically conductive wire or line 72 is located above the reader element 16 between the reader pole 19 and the opposing pole 14. A second conductive line 74 is located between the opposing pole 14 and the main write pole 12. As most clearly shown in the air bearing surface view of FIG. 9, the first and second conductive lines 72 and 74 are electrically connected by a termination 76. The conductive lines 72, 74 and termination 76 may be made of any suitable electrically conductive material such as Cu, Ag or Ta.

When current is applied across the conductive lines 72 and 74, the noise-suppressing magnetic field $H_L$ is generated between the writer pole 19 and opposing pole 14 through the soft underlayer 24. Due to the smaller cross sectional size of the main write pole 12, current flowing through the conductive lines 72 and 74 generates the magnetic field $H_L$ shown in FIG. 8 between the reader pole 19 and opposing pole 14, rather than generating any significant amount of magnetic flux between the opposing pole 14 and main write pole 12. In this manner, the noise-suppressing magnetic field $H_L$ is generated in the region of the soft magnetic underlayer 24 located under the reader element 16.

The yoke width of the poles 14 and 18 should be significantly greater than the read element 16 width so that a sufficiently wide region of the soft underlayer is saturated. Also, the reluctance of the magnetic circuit defined by the yoke and the soft underlayer will decrease as the width of the yoke structure is increased. If a soft underlayer of 0.3 $\mu$m thickness is used, a yoke structure having widths of at least 2 $\mu$m may be adequate to efficiently saturate the soft underlayer with the currents less than 50 mA.

In the embodiments shown in FIGS. 4–9, the noise-suppressing magnetic field $H_L$ is generated in a direction parallel with the recording tracks of the recording layer 26, i.e., in the circumferential travel direction of the disk. In contrast, in the embodiments of FIGS. 10–13 described below, the noise-suppressing magnetic field $H_R$ is generated in the soft underlayer 24 in the radial direction of the disk, i.e., perpendicular to the recording tracks and circumferential travel direction of the disk. Alternatively, the noise-suppressing magnetic field may be generated in any other orientation in the soft underlayer which effectively reduces the underlayer noise.

Figure 10:
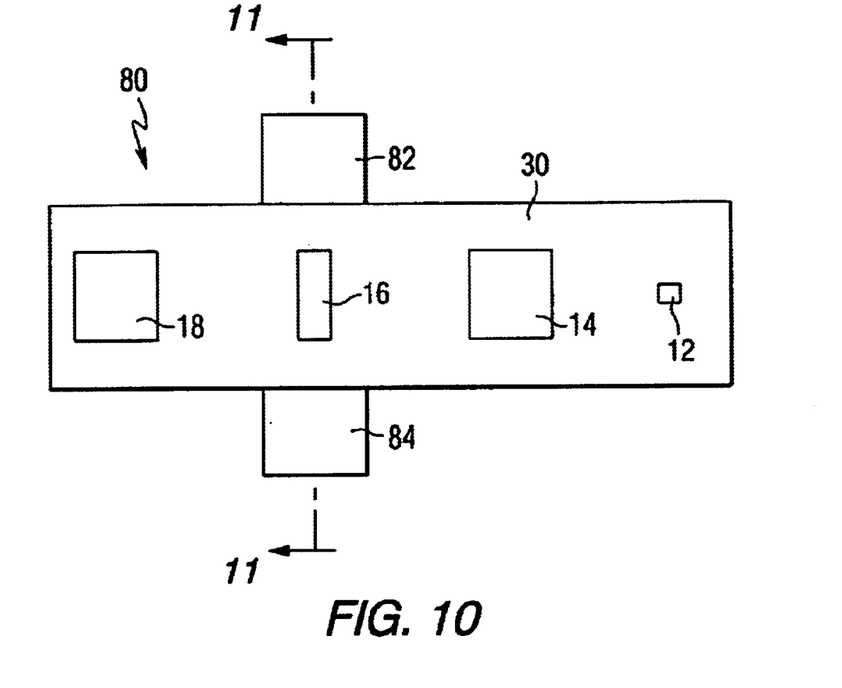
FIG. 10 is a partially schematic bottom view of the air-bearing surface of a perpendicular magnetic recording head including noise-suppressing magnets in accordance with another embodiment of the present invention.
Figure 11:
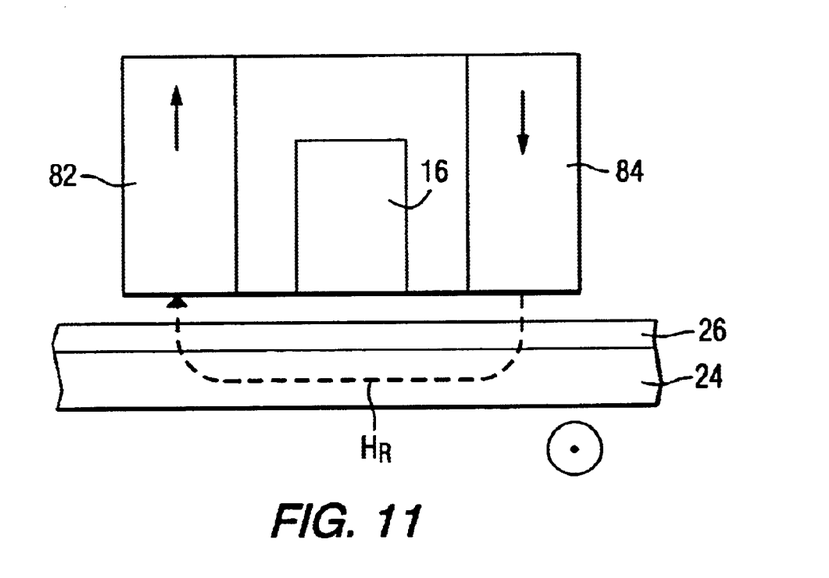
FIG. 11 is a partially schematic view taken through section 11—11 of FIG. 10.

FIG. 10 is a partially-schematic bottom view of the air bearing surface 30 of a perpendicular magnetic recording head 80 in accordance with an embodiment of the present invention. FIG. 11 is a sectional view taken through section 11—11 of FIG. 10. The recording head 80 includes the main write pole 12, opposing pole 14, reader element 16 and reader pole 18, as previously described. In this embodiment, magnets 82 and 84 are located on opposite sides of the recording head 80. The reader element 16 is positioned between the magnets 82 and 84. The magnets 82 and 84 generate the noise-suppressing magnetic field $H_R$ in the soft underlayer 24. In FIG. 11, the direction of travel of the recording disk is perpendicular to the plane of the drawing. The noise-suppressing magnetic field $H_R$ is oriented in the radial direction of the disk, perpendicular to the recording tracks of the disk.

Figure 12:
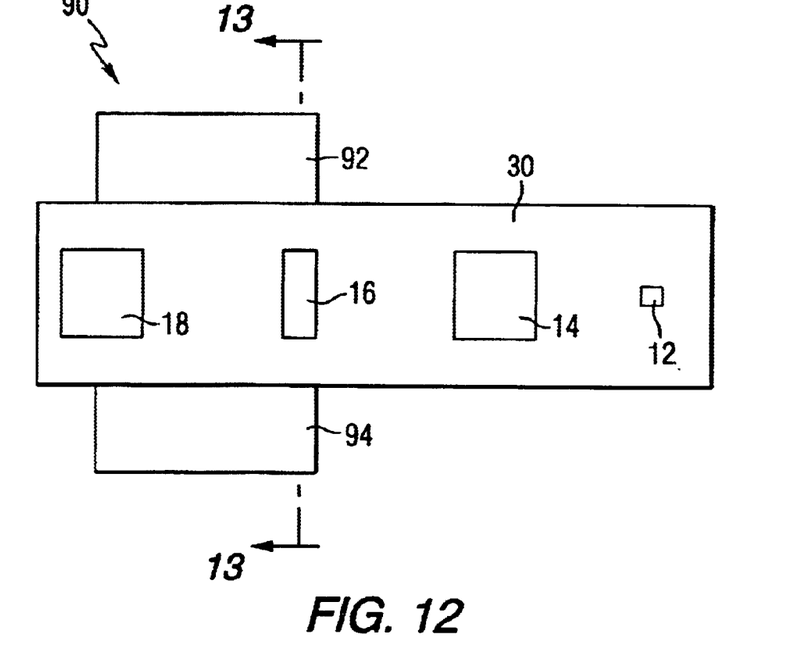
FIG. 12 is a partially schematic bottom view of the air-bearing surface of a perpendicular magnetic recording head including noise-suppressing magnets in accordance with another embodiment of the present invention.
Figure 13:
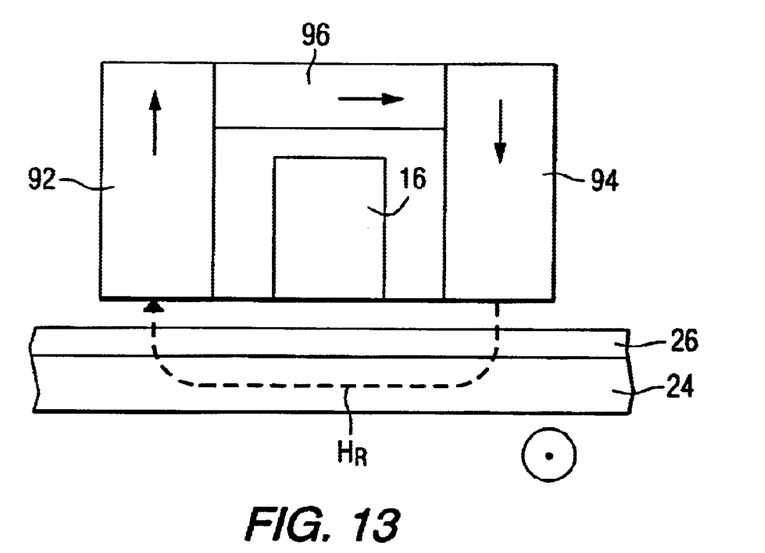
FIG. 13 is a partially schematic view taken through section 13—13 of FIG. 12.

FIGS. 12 and 13 schematically illustrate a recording head 90 similar to the embodiment shown in FIGS. 10 and 11. In this embodiment, magnets 92 and 94 are located on opposite sides of the recording head 90, with their trailing edges even with the trailing edge of the reader element 16. As shown in FIG. 13, a magnetically permeable yoke 96 connects the magnets 92 and 94. By positioning the magnets 92 and 94 along the sides of the recording head 90 as shown in FIG. 12, the noise-suppressing magnetic field $H_R$ is generated in the soft underlayer 24 in a region located below both the reader pole 18 and reader element 16. This arrangement maximizes the noise-suppressing magnetic field $H_R$ in the most beneficial region of the soft underlayer 24 as the disk travels below the reader of the head 90.

By generating a noise-suppressing magnetic field $H_R$ in a radial direction in the soft underlayer 24, e.g., as shown in the embodiments of FIGS. 10–13, the magnetization switching characteristics of the recording media may be improved. This results from rotation of magnetization being faster than domain wall motion. By biasing the noise-suppressing magnetic field perpendicular to the recording tracks of the media, the magnetization in the soft underlayer will be rotated during the reading process. Furthermore, radial biasing of the soft underlayer may also reduce Barkhausen noise.

The present recording head structure may be fabricated using standard deposition techniques. First, a relatively hard magnetic material is deposited. A conventional longitudinal media combination to orient magnetization in the plane of the substrate, such as NiP/Cr/CoCr, can be utilized. During deposition, the magnetic field can be applied to define the in-plane orientation perpendicular to the air bearing surface. Then, isolated by the alumina layers from both sides a read element is deposited. Lithography can be used to define an interconnect made of a soft NiFe to create a closed magnetic path. As the last step, a soft shield, e.g., Permalloy, may be deposited. As a result, a reader is surrounded by a closed magnetic flux path. A part of this closed path is the region in the soft underlayer underneath the head. This, in turn, provides automatic biasing of the soft underlayer near the reader, thus eliminating domain walls in the vicinity of the reader.

Figure 14:
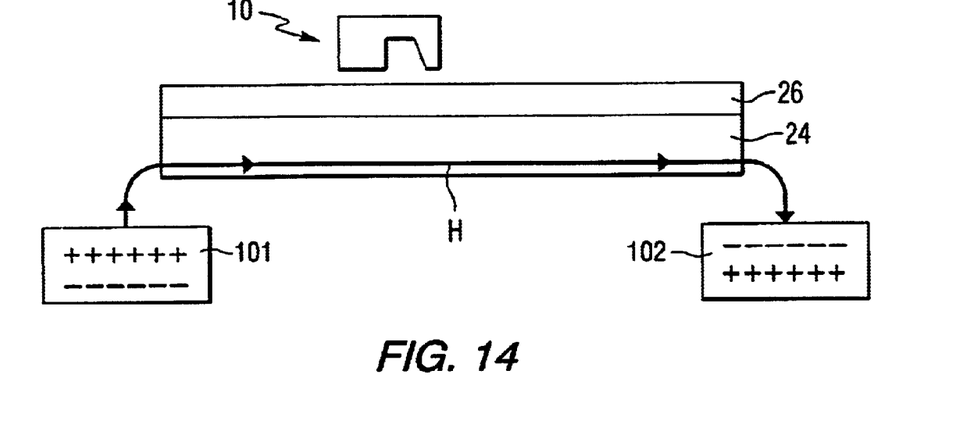
FIG. 14 is a partially schematic side view of a test arrangement evaluating the effectiveness of using magnets for noise suppression in accordance with the present invention.

A perpendicular write head similar to the recording head 10 shown in FIGS. 1 and 2 was made by a standard focused ion beam trimming process from the air bearing surface. Then, using a spin-stand, a single transition was written by this head on a perpendicular recording disk with a 1,000 nm thick soft underlayer made of Permalloy. The signal was read by a conventional read element. During reading two permanent magnets 101 and 102 were put at the opposite edges of the disk, as schematically shown in FIG. 14. Due to the soft underlayer 24, there was a well-defined magnetic path H for the flux generated by the magnets 101 and 102 (the path is through a soft underlayer, thus the reader was not affected by stray fields from the magnets). Acting as a partially closed magnetic flux path H between the two magnets 101 and 102, the soft underlayer 24 was automatically biased.

Figure 15:
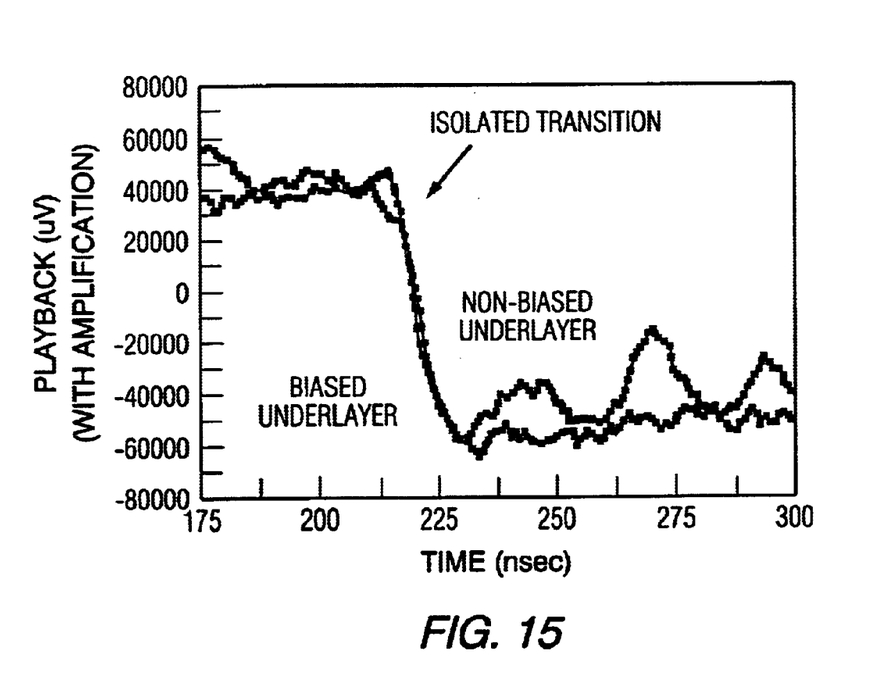
FIG. 15 is a graph of playback versus time for the test arrangement of FIG. 14, showing the difference in playback characteristics when the soft magnetic underlayer of the recording disk is biased and unbiased.

The signals recorded for the cases of a non-biased and biased soft underlayer are shown in FIG. 15. It can be seen that the noise significantly decreases when the biasing is generated. At least a 3–4 dB change can be seen.

Figure 16:
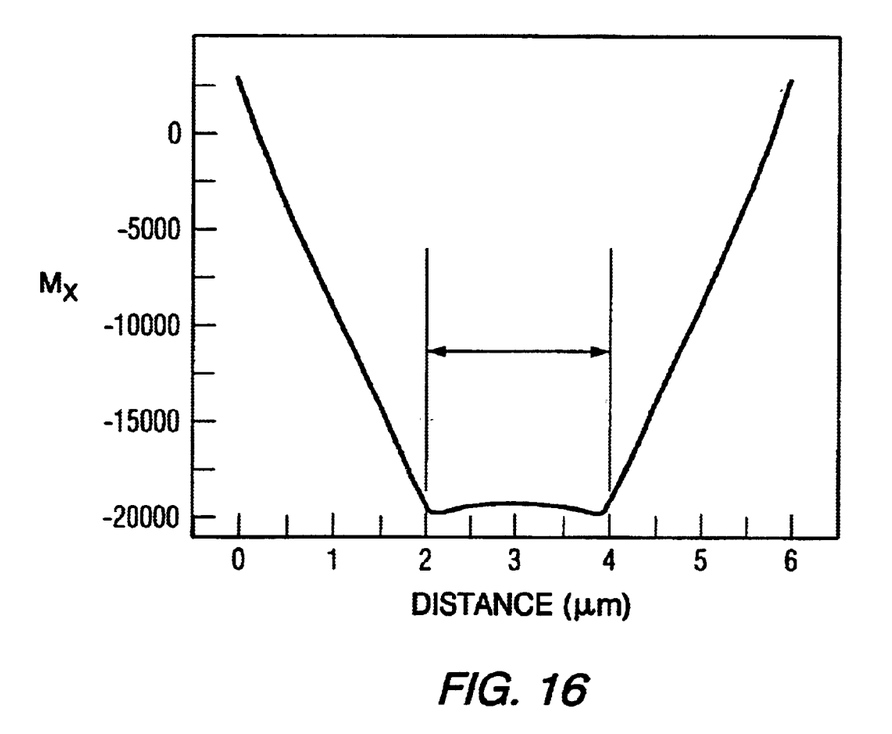
FIG. 16 is a graph of magnetic field versus distance across the width of a write pole of a perpendicular magnetic recording head.

Commercially available boundary element solver software, Amperes, was used to calculate magnetic field distribution. Both the yoke structure and the soft underlayer are assumed to be made of a soft magnetic material with $4\pi M_S=19.8$ kGauss and $H_k=6.06$ Oe. A 50 mA current through the current lead is sufficient to completely saturate the soft underlayer region underneath the read element. The biasing field direction corresponds to the direction either along or across the track. The choice for the orientation of the proposed yoke structure may depend on the recorded bit pattern and on a particular biasing of the soft underlayer. In one embodiment, the magnetization switching in the soft underlayer is driven by the magnetization rotation. For example, if a cross-talk between the tracks is negligible, the orientation of the yoke may be such that the biasing field direction is perpendicular to the direction of the track. FIG. 16 shows components of magnetization M inside the soft underlayer underneath the yoke structure. The region of the soft underlayer located between the two poles is completely saturated.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular magnetic recording head comprising:
   at least one magnetic reading element; and
   means for generating a magnetic field which reduces noise from a soft magnetic underlayer of a recording medium during operation of the magnetic reading element.

2. The perpendicular magnetic recording head of claim 1, wherein the means for generating the magnetic field comprises at least one electrically conductive element for inducing the magnetic field.

3. The perpendicular magnetic recording head of claim 2, wherein the electrically conductive element comprises a coil.

4. The perpendicular magnetic recording head of claim 2, wherein the electrically conductive element comprises a wire.

5. The perpendicular magnetic recording head of claim 1, wherein the means for generating the magnetic field further comprises a yoke from which the magnetic field flux flows.

6. The perpendicular magnetic recording head of claim 1, wherein the means for generating the magnetic field comprises at least one permanent magnet.

7. The perpendicular magnetic recording head of claim 1, wherein the magnetic field is generated in a plane of the soft magnetic underlayer in a direction substantially perpendicular to recording tracks of the recording medium.

8. The perpendicular magnetic recording head of claim 1, wherein the magnetic field is generated in a plane of the soft magnetic underlayer in a direction substantially parallel with recording tracks of the recording medium.

9. A perpendicular magnetic recording head comprising:
   at least one magnetic reading element; and
   at least one noise-suppressing magnetic field generating element spaced apart from the at least one magnetic reading element for generating the noises-suppressing magnetic field during operation of the magnetic reading element.

10. The perpendicular magnetic recording head of claim 9, wherein the noise-suppressing magnetic field generating element comprises at least one electrically conductive element.

11. The perpendicular magnetic recording head of claim 10, wherein the electrically conductive element comprises a coil.

12. The perpendicular magnetic recording head of claim 10, wherein the electrically conductive element comprises a wire.

13. The perpendicular magnetic recording head of claim 10, wherein the noise-suppressing magnetic field generating element further comprises a yoke structured and arranged such that a current applied to the electrically conductive element induces magnetic flux in the yoke which generates the magnetic field.

14. The perpendicular magnetic recording head of claim 9, wherein the noise-suppressing magnetic field generating element comprises a permanent magnet.

15. The perpendicular magnetic recording head of claim 9, wherein the magnetic field is generated in a plane of the soft magnetic underlayer in a direction substantially perpendicular to recording tracks of the recording medium.

16. The perpendicular magnetic recording head of claim 9, wherein the magnetic field is generated in a plane of the soft magnetic underlayer in a direction substantially parallel with recording tracks of the recording medium.

17. A perpendicular magnetic recording system comprising:
   a perpendicular magnetic recording medium including a hard magnetic recording layer and a soft magnetic underlayer; and
   a perpendicular magnetic recording head positionable over the medium including at least one magnetic reading element and at least one noise-suppressing magnetic field generating element positioned to generate a noise-reducing magnetic field in the soft magnetic underlayer in a region of the medium under the head during operation of the magnetic reading element.

18. The perpendicular magnetic recording system of claim 17, wherein the noise-suppressing magnetic field generating element comprises at least one electrically conductive element.

19. The perpendicular magnetic recording system of claim 18, wherein the electrically conductive element comprises a coil.

20. The perpendicular magnetic recording system of claim 18, wherein the electrically conductive element comprises a wire.

21. The perpendicular magnetic recording system of claim 18, wherein the noise-suppressing magnetic field generating element further comprises a yoke structured and arranged such that a current applied to the electrically conductive element induces magnetic flux in the yoke which generates the magnetic field.

22. The perpendicular magnetic recording system of claim 17, wherein the noise-suppressing magnetic field generating element comprises a permanent-magnet.

23. The perpendicular magnetic recording system of claim 17, wherein the magnetic field is generated in a plane of the soft magnetic underlayer in a direction substantially perpendicular to recording tracks of the recording medium.

24. The perpendicular magnetic recording system of claim 17, wherein the magnetic field is generated in a plane of the soft magnetic underlayer in a direction substantially parallel with recording tracks of the recording medium.

* * * * *

UNITED STATES PATENT AND TRADEMARK OFFICE
CERTIFICATE OF CORRECTION

PATENT NO. : 6,667,848 B1
DATED : January 10, 2001
INVENTOR(S) : Sakhrat Khizroev et al.

It is certified that error appears in the above-identified patent and that said Letters Patent is hereby corrected as shown below:

Title page,
Item [60], Related U.S. Application Data, "06/175,265 should read -- 60/175,265 --.

Column 1,
Line 45, "$B_s$<20kG" should read -- $B_s$>20kG --.

Column 4,
Line 43, "Mw" should read -- $M_w$ --.
Line 49, "hep" should read -- hcp --.

Column 10,
Line 20, "noises" should read -- noise --.

Signed and Sealed this

Twenty-seventh Day of July, 2004

JON W. DUDAS
*Acting Director of the United States Patent and Trademark Office*